(12) United States Patent
Isobe et al.

(10) Patent No.: US 9,371,867 B2
(45) Date of Patent: Jun. 21, 2016

(54) POWER TRANSMITTING APPARATUS

(71) Applicant: Kabushiki Kaisha F.C.C., Hamamatsu-shi (JP)

(72) Inventors: Kenichirou Isobe, Hamamatsu (JP); Shigeki Kawashima, Hamamatsu (JP); Shinji Furuhashi, Hamamatsu (JP); Go Ando, Hamamatsu (JP)

(73) Assignee: KABUSHIKI KAISHA F.C.C., Hamamatsu-shi (JP)

( * ) Notice: Subject to any disclaimer, the term of this patent is extended or adjusted under 35 U.S.C. 154(b) by 0 days.

(21) Appl. No.: 14/317,240

(22) Filed: Jun. 27, 2014

(65) Prior Publication Data

US 2014/0326570 A1 Nov. 6, 2014

Related U.S. Application Data

(63) Continuation of application No. PCT/JP2012/084079, filed on Dec. 28, 2012.

(30) Foreign Application Priority Data

Dec. 28, 2011 (JP) ................. 2011-287229

(51) Int. Cl.
  *F16D 13/54* (2006.01)
  *F16D 13/56* (2006.01)
(52) U.S. Cl.
  CPC ............. *F16D 13/54* (2013.01); *F16D 13/56* (2013.01); *F16D 2013/565* (2013.01)

(58) Field of Classification Search
None
See application file for complete search history.

(56) References Cited

U.S. PATENT DOCUMENTS

| 5,617,938 A * | 4/1997 | Tsukada et al. .............. 192/54.5 |
| 2008/0308382 A1 * | 12/2008 | Kataoka et al. .............. 192/93 R |
| 2009/0242349 A1 * | 10/2009 | Miyazaki ................ F16D 13/04 |
| | | 192/70.2 |

FOREIGN PATENT DOCUMENTS

| JP | 2009-068578 | 4/2009 |
| JP | 2010-053988 | 3/2010 |
| JP | 2010-223296 | 10/2010 |

* cited by examiner

*Primary Examiner* — Mark Manley
(74) *Attorney, Agent, or Firm* — Knobbe, Martens, Olson & Bear, LLP

(57) ABSTRACT

A power transmitting apparatus which can suppress the rotational vibrations by suppressing rotation of the pressure member relative to the clutch member is provided. The power transmitting apparatus can comprise a clutch housing rotatable together with an input member and a plurality of driving-side clutch discs mounted thereon; a clutch member with a plurality of driven-side clutch discs mounted thereon and interleaved with the driving-side clutch discs; and a pressure member axially movably relative to the clutch member to increase or release the press-contacting force acting on the driving-side clutch discs and the driven-side clutch discs. The power transmitting apparatus can further comprise one or more slide-suppressing members for applying sliding resistance to the pressure member when the pressure member is rotated relative to the clutch member.

19 Claims, 8 Drawing Sheets ated by vibrations etc. transmitted from the engine. Accordingly, it is possible to surely obtain an advantageous effect of prevention of generation of abnormal noises or feeling suggesting malfunction of operation.

POWER TRANSMITTING APPARATUS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

1. Technical Field

The present inventions relate to a power transmitting apparatus for arbitrarily transmitting or cutting-off the rotational driving power of an input member to or from an output member

2. Description of the Related Art

In general, the power transmission apparatus for a motorcycle is intended to arbitrarily perform transmission or cutting-off of the driving power of an engine to or from a transmission and a driving wheel and comprises an input member connected to an engine-side, an output member connected to a transmission and a driving wheel-side, and a clutch member connected to the output member. The driving power can be transmitted by press-contacting a plurality of driving-side clutch discs and driven-side clutch discs each other or cut off by releasing the press-contacting force acting on the driving-side clutch discs and driven-side clutch discs.

More particularly, the power transmitting apparatus of the prior art (e.g., of Japanese Patent Application JP 2010-223296 A) comprises a clutch housing rotatable together with an input member and mounted thereon a plurality of driving-side clutch discs, a plurality of driven-side clutch discs arranged alternately between the driving-side clutch discs, a clutch member connected to an output member, and a pressure member mounted on the clutch member axially movably relative to the clutch member for forcing the driving-side clutch discs and the driven-side clutch discs to be press-contacted each other and release the press-contacting force acting on them in accordance with axial movement relative to the clutch member. The power transmitting apparatus of the prior art is constructed so as to transmit or cut off the driving power inputted to the input member to or from the output member by press-contacting the driving-side clutch discs and the driven-side clutch discs each other or releasing a press-contacting force acting on them.

SUMMARY OF THE INVENTIONS

An aspect of at least one of the inventions disclosed herein includes the realization that the power transmitting apparatus of the prior art, the pressure member would be sometimes rotated relative to the clutch member by vibrations transmitted from an engine (e.g., when a vehicle is stopped in a neutral position of a transmission). In some cases, the rotational vibration of the pressure member is not restrained when the axial vibration is restrained by using clutch springs or other structures. Accordingly, structural components of the power transmitting apparatus of the prior art have been found to interfere with each other to some extent and thus cause abnormal noises and/or a feeling suggesting a malfunction in operation.

It is, therefore, an object of at least one of the present inventions to provide a power transmitting apparatus which can suppress the rotational vibrations by suppressing rotation of the pressure member relative to the clutch member.

In some embodiments, a power transmitting apparatus can comprise a clutch housing rotatable together with an input member and a plurality of driving-side clutch discs mounted thereon; a clutch member with mounted thereon a plurality of driven-side clutch discs mounted thereon and arranged between the driving-side clutch discs alternately therewith and connected to an output member; and a pressure member mounted on the clutch member and axially movably relative to the clutch member so that the driving-side clutch discs and the driven-side clutch discs are forced to be press-contacted with each other member in order to transmit a rotational driving force inputted to the input member to the output member when the pressure member moves axially toward the clutch member and the press-contacting force acting on them is released when the pressure member is moved axially away from the clutch in order to cut off the rotational driving force from the output member; wherein the power transmitting apparatus further comprises a slide-suppressing member for applying sliding resistance to the pressure member when the pressure member is rotated relative to the clutch member.

In some embodiments, the power transmitting apparatus further comprises a press-contact assisting cam for increasing the press-contacting force acting on the driving-side clutch discs and the driven-side clutch discs by causing relative rotation of the pressure member and the clutch member and bringing them close to each other when the rotational driving power inputted to the input member is transmitted to the output member, and a back-torque limiting cam for releasing the press-contacting force acting on the driving-side clutch discs and the driven-side clutch discs by causing relative rotation of the pressure member and the clutch member and separating them from each other when a rotational speed of the output member has exceeded that of the input member.

In some embodiments, the pressure member and the clutch member are assembled and axially fitted with each other, and the slide-suppressing member is arranged on a fitting surface of the pressure member or of the clutch member.

In some embodiments, the slide-suppressing member is arranged on an axially facing surface of the pressure member or of the clutch member.

In some embodiments, the power transmitting apparatus further comprises a limiting member for preventing the pressure member from being separated from the clutch member beyond a predetermined distance, and the slide-suppressing member is arranged on the pressure member so that it can slide on a surface of the limiting member.

In some embodiments where the power transmitting apparatus comprises one or more slide-suppressing members for applying sliding resistance to the clutch member when the pressure member is rotated relative to the clutch member, it is possible to suppress rotational vibration of the pressure member by suppressing the rotation of the pressure member relative to the clutch member.

In some embodiments where the power transmitting apparatus comprises a press-contact assisting cam for increasing the press-contacting force acting on the driving-side clutch discs and the driven-side clutch discs by causing relative rotation of the pressure member and the clutch member and bringing them close to each other when the rotational driving power inputted to the input member is transmitted to the output member, and a back-torque limiting cam for releasing the press-contacting force acting on the driving-side clutch discs and the driven-side clutch discs by causing relative rotation of the pressure member and the clutch member and separating them from each other when a rotational speed of the output member has exceeded that of the input member, it is possible to prevent the pressure member from being rotationally vibrated due to transmission of vibration of an engine or other mechanism to the pressure member and thus to inhibit or prevent the vibration from being transmitted to operation means of a vehicle such as a clutch lever or other mechanism.

In some embodiments where the pressure member and the clutch member are assembled while being axially fitted with each other, and the slide-suppressing member is arranged on a fitting surface of the pressure member or of the clutch member, it is possible to suppress the rotational vibration of the pressure member without adverse influence to the operability of the pressure member.

In some embodiments where the slide-suppressing member is arranged on an axially facing surface of the pressure member or of the clutch member, it is possible to generate the sliding resistance when the pressure member is close to the clutch member and not to generate the sliding resistance when the pressure member is axially separated from the clutch member.

In some embodiments where the power transmitting apparatus further comprises a limiting member for preventing the pressure member from being separated from the clutch member beyond a predetermined distance, and the slide-suppressing members are arranged on the pressure member so that they can slide on a surface of the limiting member, it is possible to mount or replace the slide-suppressing members when the clutch member and the pressure member are assembled with each other.

DETAILED DESCRIPTION OF THE PREFERRED EMBODIMENTS

Figure 1:
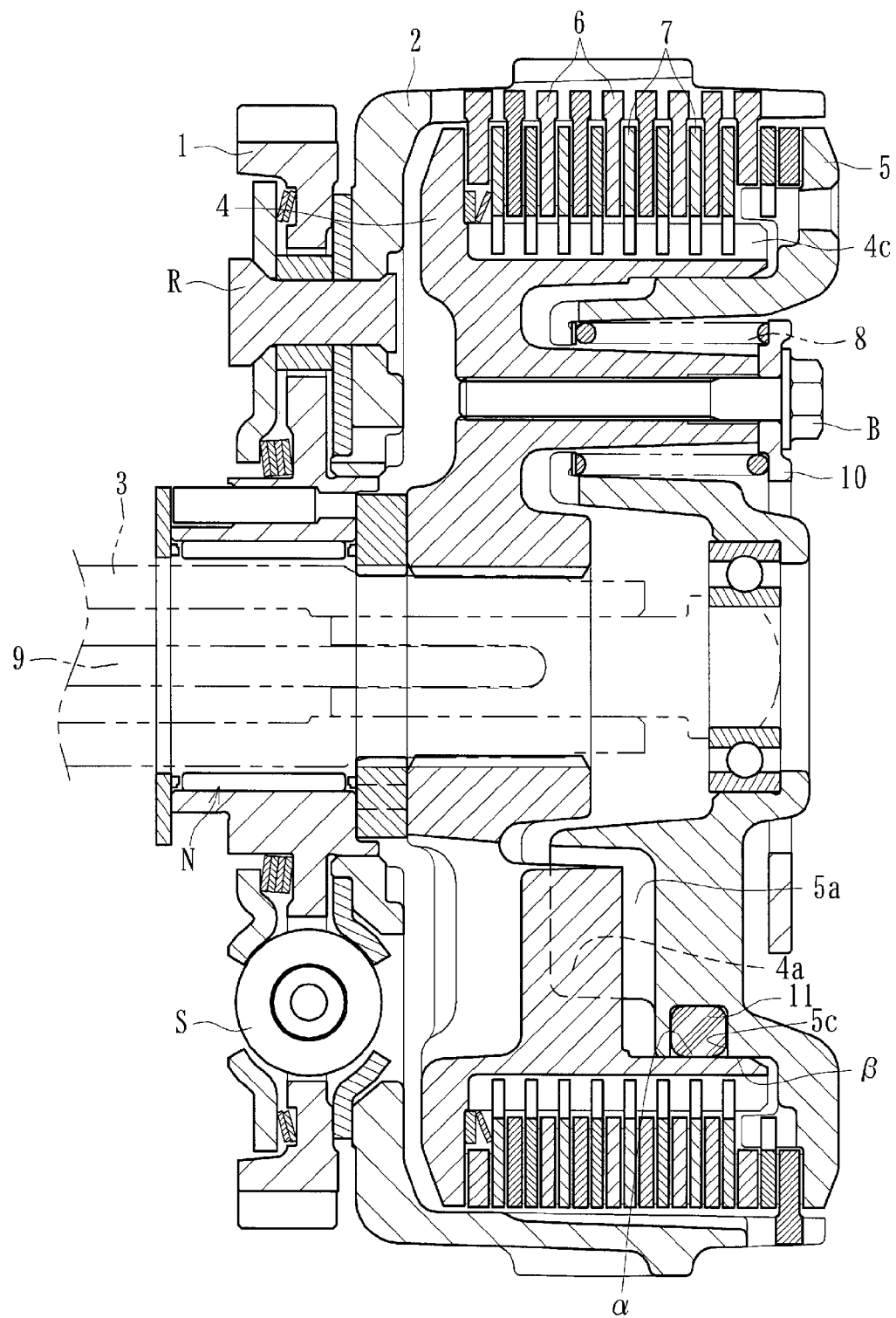
FIG. 1 is a longitudinal sectional view of a power transmitting apparatus of a first embodiment of an embodiment.
Figure 2A:
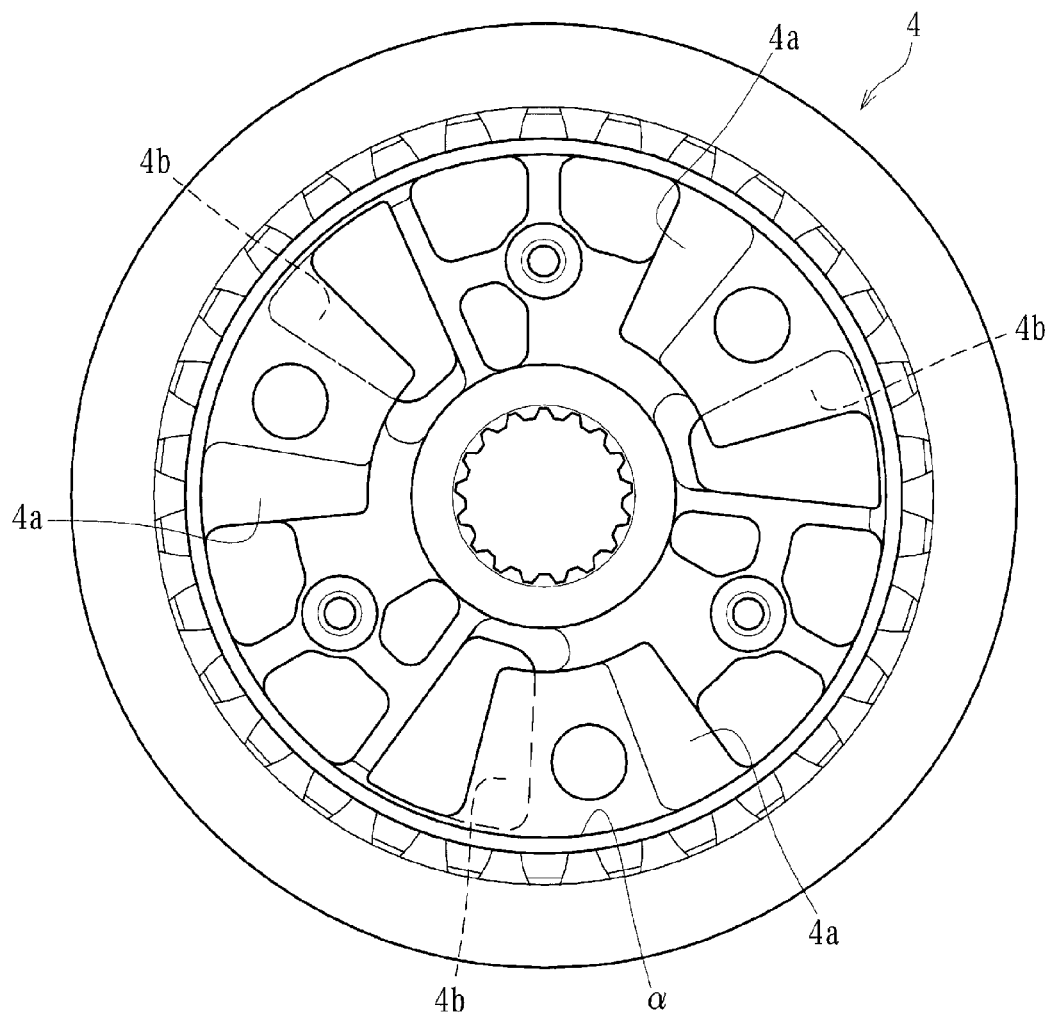
FIG. 2A is a plan view showing a clutch member of the power transmitting apparatus of FIG. 1.
Figure 2B:
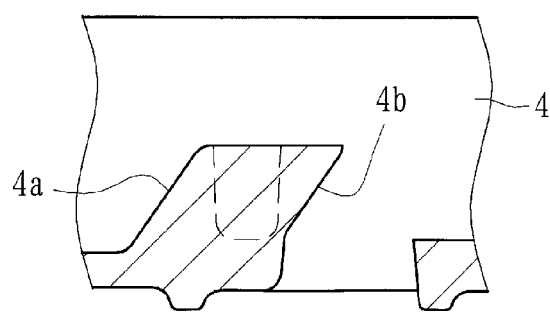
FIG. 2B is a schematic view showing a first cam surface and a second cam surface of the clutch member
Figure 3A:
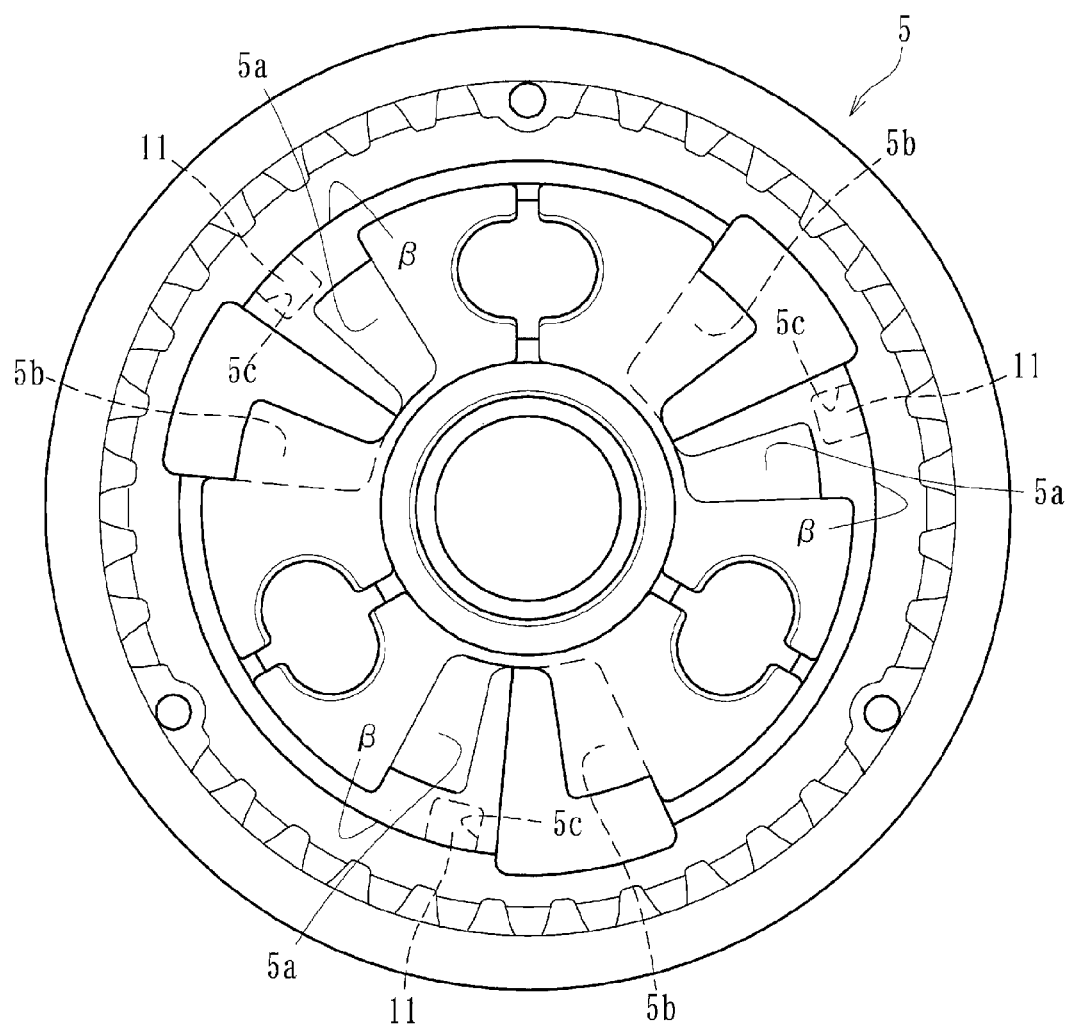
FIG. 3A is a plan view showing a pressure member of the power transmitting apparatus of FIG. 1.
Figure 3B:
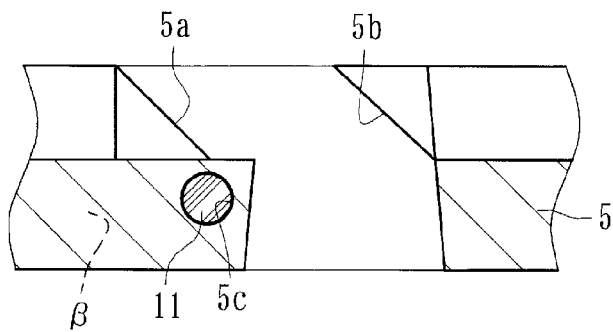
FIG. 3B is a schematic view showing a condition in which a slide-suppressing member is mounted.

A power transmitting apparatus of the present disclosure can be mounted on a vehicle such as a motorcycle to arbitrarily transmit or cut off the driving power of an engine to or from a transmission or driving wheel. As shown in FIGS. 1-3, the power transmitting apparatus can comprise a clutch housing 2 formed by die-casting on which a gear 1 as an input member is mounted. In some embodiments, the power transmitting apparatus comprises a clutch member 4 connected to a shaft 3 (e.g., an output member). As illustrated, the power transmitting apparatus can comprise a pressure member 5 fitted on the clutch member 4 at its right-hand end (.e.g., with respect to the orientation of FIG. 1). In some cases, the power transmitting apparatus comprises driving-side clutch discs 6 mounted on the clutch housing 2, and driven-side clutch discs 7 connected to the clutch member 4. The power transmitting apparatus can include first and second cam surfaces 4a, 4b of a clutch member-side formed on the clutch member 4. In some embodiments, the power transmitting apparatus includes first and second cam surfaces 5a, 5b of a pressure member-side formed on the pressure member 5. As illustrated, the power transmitting apparatus can include a limiting member 10 and/or a slide-suppressing member 11. A reference character "S" denotes dampers and "N" denotes a needle bearings.

The gear 1 can be rotated around the shaft 3 by the driving power (e.g., rotational power) transmitted from the engine and can be connected to the clutch housing 2 via rivets "R" or other fastening methods or structures. The clutch housing 2 can be formed as a cylindrical casing opened at its right-hand end (e.g., as seen in FIG. 1). A plurality of driving-side clutch discs 6 can be mounted on the inner circumference of the clutch housing 2. Each of the driving-side clutch discs 6 can comprise a substantially annular plate and can be adapted to be spline-engaged with a spline formed on the inner circumference of the clutch housing 2 so as to be rotatable together with the clutch housing 2 and axially slidable (e.g., in the left-hand and right-hand directions seen in FIG. 1) there along.

The clutch member 4 can include a member to be arranged within the clutch housing 2 and can be formed with a splined bore in its center for receiving a splined end of the shaft 3. This enables the shaft 3 to be rotated together with the clutch member 4. The outer circumference of the clutch member 4 can be formed with spline (e.g., the spline-fitting portion 4c) on which the driven-side clutch discs 7 are fitted.

The spline (e.g., the spline-fitting portion 4c) formed on the clutch member 4 can be include alternately arranged projections and grooves integrally formed on the outer circumference of the clutch member 4 substantially all around thereof so as to be engaged with the spline formed on the driven-side clutch discs 7 such that the driven-side clutch discs 7 can axially move along the spline of the clutch member 4 but cannot rotate relative to the clutch member 4.

The driving-side clutch discs 6 and driven-side clutch discs 7 can be interleaved (e.g., alternately arranged to form a lamination) and adapted to be press-contacted and released from the press-contacting force. In some cases, both clutch discs 6, 7 are axially slidable along the clutch housing 2 and the clutch member 4 respectively and press-contacted when they are pressed toward the left-hand direction in FIG. 1 by the pressure member 5 so that the rotational driving force of the clutch housing 2 can be transmitted to the shaft 3 via the clutch member 4. On the contrary, when the pressing force of the pressure member 5 is released, the press-contacting force between the clutch discs 6, 7 is also released and the transmission of the rotational force to the shaft 3 can be cut off.

The pressure member 5 can be fitted to the clutch member 4 at the right-hand end (e.g., as defined in FIG. 1) thereof and adapted to be axially moved in the left and right-hand directions in FIG. 1 relative to the clutch member 4 so as to press-contact the driving-side and driven-side clutch discs 6, 7 and release the pressing force between them. The pressure member 5 can be normally urged toward a left-hand direction (e.g., as defined in FIG. 1) by one or more biasing members (e.g., clutch springs 8) and can be moved toward a right-hand direction (e.g., a direction separating from the clutch member 4) by actuating an operating mechanism or device such as a clutch lever and projecting a push rod 9 axially extending within the shaft 3 toward a right-hand direction (e.g., as defined in FIG. 1) against an urging force of the clutch springs 8.

In some embodiments, the press-contacting force between the driving-side clutch discs 6 and the driven-side clutch discs 7 is released and thus the rotational driving force inputted to the gear 1 and the clutch housing 2 is cut off without being transmitted to the clutch member 4 and the shaft 3 when the pressure member 5 is returned toward the right-hand direction of FIG. 1. In some cases, the pressure member 5 is structured so that it can press-contact the driving-side clutch discs 6 and the driven-side clutch discs 7 or release the pressing force between them according to the axial movement of the pressure member 5 relative to the clutch member 4.

As shown in FIGS. 2 and 3, the clutch member 4 can be formed with a first cam surface 4a and a second cam surface 4b on a clutch member-side. The pressure member 5 can be formed with a first cam surface 5a and a second cam surface 5b on a pressure member-side. A press-contact assisting cam can be formed with an oppositely arranged combination of the first cam surface 4a of clutch member-side and the first cam surface 5a of pressure member-side, and a back-torque limiting cam can be formed of an oppositely arranged combination of the second cam surface 4b of pressure member-side and the second cam surface 5b.

Figure 4:
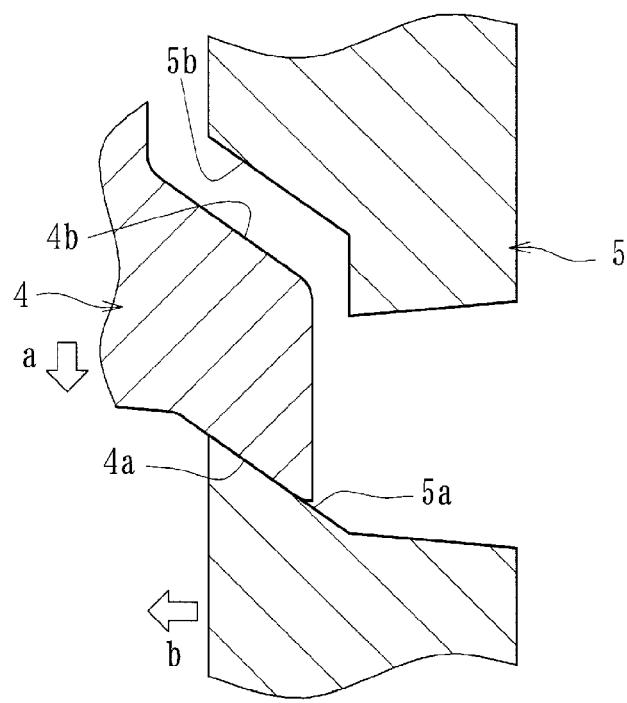
FIG. 4 is a schematic view showing an action of a press-contact assisting cam of the power transmitting apparatus of FIG. 1.

The press-contact assisting cam can function to increase the press-contacting force between the driving-side clutch discs 6 and the driven-side clutch discs 7 by forcing them to be close to each other due to relative rotation of the pressure member 5 and the clutch member 4 when the rotational driving force inputted to the clutch housing (e.g., the input member) 2 is transmitted to the shaft (e.g., the output member) 3. In some embodiments, since the clutch member 4 rotates in an "a" direction relative to the pressure member 5 as shown in FIG. 4 when the rotational driving force inputted to the clutch housing (e.g., the input member) 2 is transmitted to the shaft (e.g., the output member) 3, the first cam surface 4a of clutch member-side can be abutted against the first cam surface 5a of pressure member-side and thus the pressure member 5 is moved in a "b" direction by cam action of these cam surfaces 4a, 5a and accordingly the press-contacting force between the driving-side clutch discs 6 and the driven-side clutch discs 7 is increased.

Figure 5:
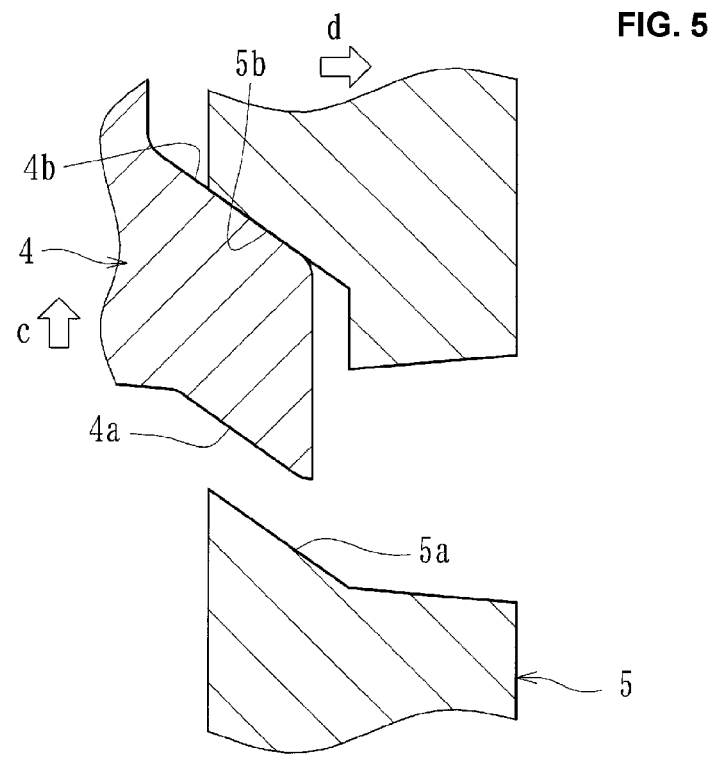
FIG. 5 is a schematic view showing a back-torque limiting cam of the power transmitting apparatus of FIG. 1.

The back-torque limiting cam can function to release the press-contacting force between the driving-side clutch discs 6 and the driven-side clutch discs 7 by forcing them to separate from each other due to relative rotation of the pressure member 5 and the clutch member 4 when the rotational speed of the shaft (e.g., the output member) 3 exceeds that of the clutch housing (e.g., the input member) 2. In some cases, when the clutch member 4 rotates in a "c" direction relative to the pressure member 5 as shown in FIG. 5 when the rotational speed of the shaft (e.g., the output member) 3 exceeds that of the clutch housing (e.g., the input member) 2, the second cam surface 4b of the clutch member-side is abutted against the second cam surface 5b of the pressure member-side and the pressure member 5 is moved in a "d" direction by cam action of these cam surfaces 4b, 5b and the press-contacting force between the driving-side clutch discs 6 and the driven-side clutch discs 7 is released.

The limiting member 10 can be formed of an annular member for preventing the pressure member 5 from being separated from the clutch member 4 beyond a predetermined distance. The limiting member 10 can be connected to the clutch member 4 via a bolt "B" so as to receive one end of each clutch spring 8 as shown in FIG. 1. The other end of each clutch spring 8 can be received by the pressure member 5 so as to urge the pressure member 5 toward the clutch member 4.

In some embodiments, the pressure member 5 is assembled to the clutch member 4 and axially fitted with the clutch member 4, and the slide-suppressing members 11 are arranged on a fitting surface "β" of the pressure member 5 and not on a fitting surface "α" of the clutch member 4. Mounting recesses 5c can be formed on the fitting surface "β" of the pressure member 5 at its predetermined positions as shown in FIG. 3 and the slide-suppressing members 11 can be press-fitted in the mounting recesses 5c.

The slide-suppressing members 11 can be formed of rubber or some other elastomeric or flexible material and can function to apply sliding resistance to the pressure member 5 when the pressure member 5 is rotated relative to the clutch member 4. In some cases, the slide-suppressing members 11 slide on the fitting surface "α" of the clutch member 4 and cause sliding resistance against the fitting surface "α" when the pressure member 5 rotates relative to the clutch member 4. Although it is shown in this embodiment that the slide-suppressing members 11 are arranged on the fitting surface "β" of the pressure member 5, it is possible to arrange the slide-suppressing members 11 on the fitting surface "α" of the clutch member 4.

Figure 6:
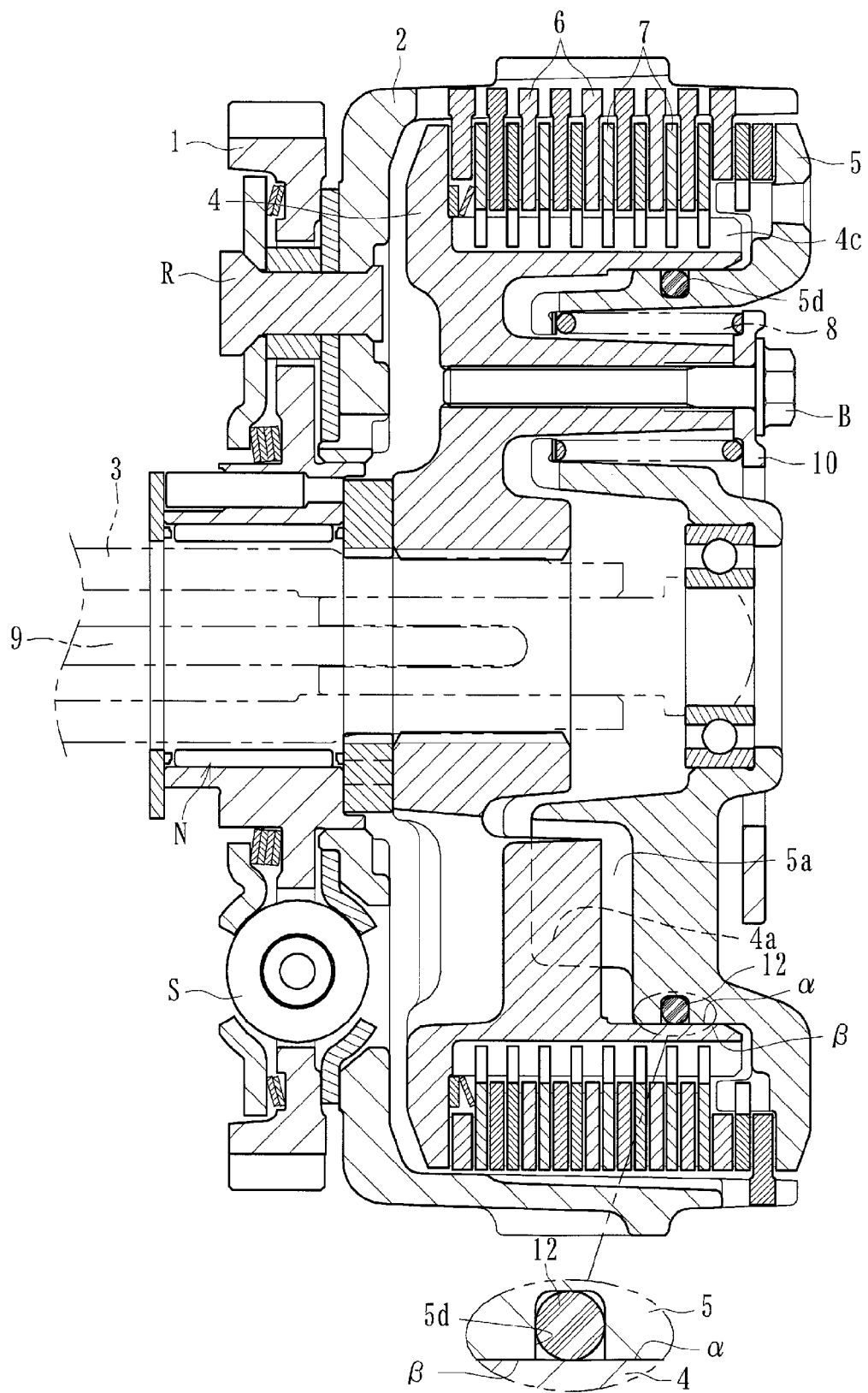
FIG. 6 is a longitudinal sectional view of a power transmitting apparatus of another embodiment of the present inventions.

According to some variants, a power transmitting apparatus of the present disclosure is mounted on vehicles (e.g., such as a motorcycle or other vehicle) to arbitrarily transmit or cut off the driving power of an engine to or from a transmission or driving wheel. As shown in FIG. 6, the power transmitting apparatus comprises a clutch housing 2 formed by die-casting on which a gear 1 as an input member is mounted. In some embodiments, a clutch member 4 is connected to a shaft 3 as an output member. In some cases, the power transmitting apparatus includes a pressure member 5, driving-side clutch discs 6 and driven-side clutch discs 7, a limiting member 10, and/or a slide-suppressing member 12.

In some cases, the power transmitting apparatus of the power transmitting apparatus of FIG. 6 is formed with a first cam surface 4a of a clutch member-side and a first cam surface 5a of a pressure member-side forming a press-contact assisting cam, and with a second cam surface 4b of clutch member-side and a second cam surface 5b of pressure member-side forming a back-torque limiting cam, respectively. Same reference numerals in FIG. 6 are used for designating same components as those used in the embodiment of FIGS. 1-5 and detailed description of them will be omitted.

In some cases, the slide-suppressing member 12 is arranged on the fitting surface "β" of the pressure member 5 and not on the fitting surface "α" of the clutch member 4. In some embodiments, a mounting groove 5d is formed on the fitting surface "β" of the pressure member 5 there along as shown in FIG. 6 and the slide-suppressing member 12 is press-fitted in the mounting groove 5d The slide-suppressing member 12 is formed of an annular sealing member (e.g. O-ring etc.) and functions to apply sliding resistance to the pressure member 5 when the pressure member 5 is rotated relative to the clutch member 4. That is, the slide-suppressing member 12 slides on the fitting surface "α" of the clutch member 4 and cause sliding resistance against the fitting surface "α" when the pressure member 5 rotates relative to the clutch member 4. Although it is shown in this embodiment that the slide-suppressing member 12 is arranged on the fitting surface "β" of the pressure member 5, it is possible to arrange the slide-suppressing member 12 on the fitting surface "α" of the clutch member 4.

Figure 7:
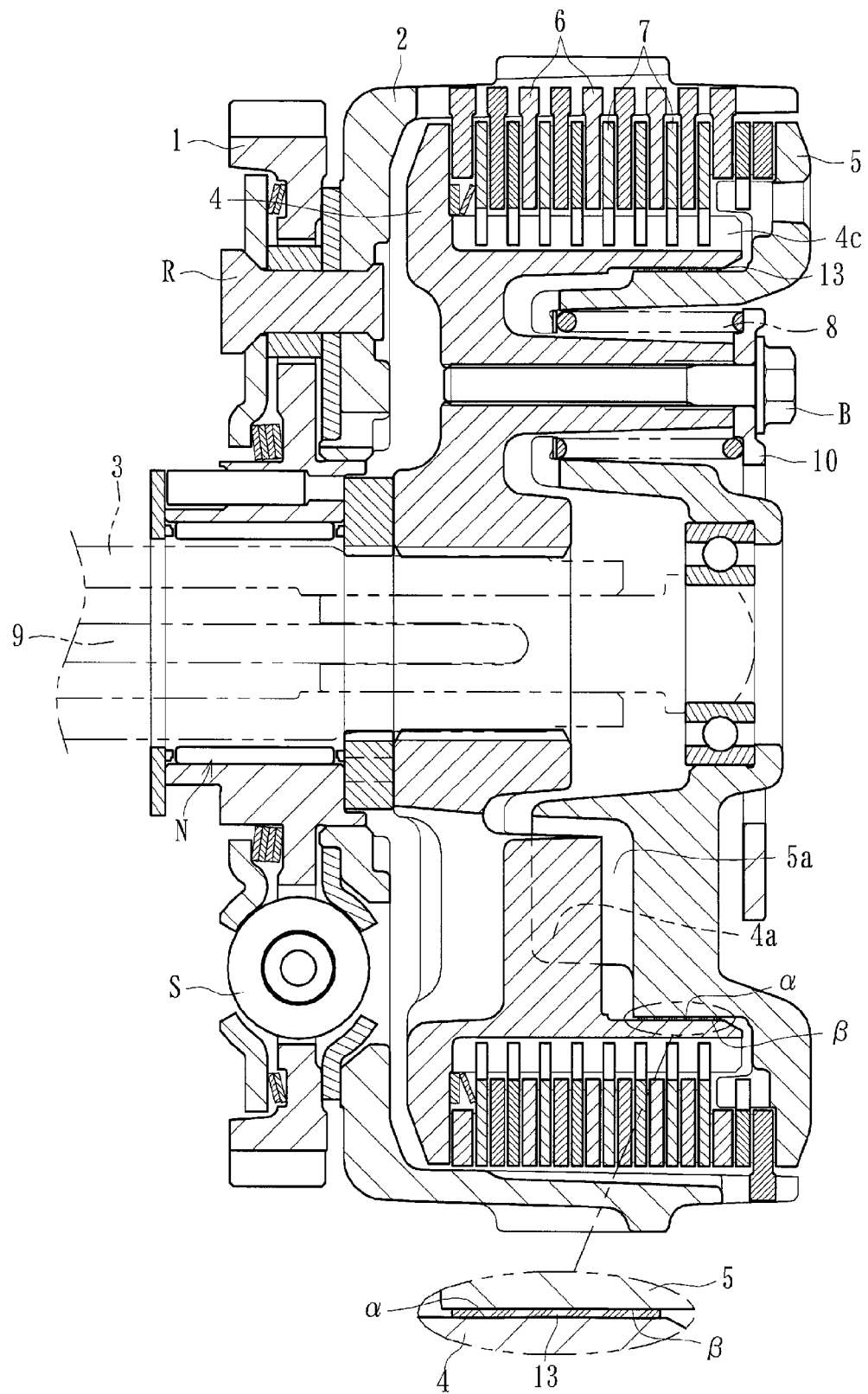
FIG. 7 is a longitudinal sectional view of a power transmitting apparatus of yet another embodiment of the present inventions.

According to some variants, a power transmitting apparatus is mounted on vehicles such as a motorcycle or other vehicle to arbitrarily transmit or cut off the driving power of an engine to or from a transmission or driving wheel. As shown in FIG. 7, the power transmitting apparatus can comprise a clutch housing 2 formed by die-casting on which a gear 1 as an input member is mounted. The power transmitting apparatus can include a clutch member 4 connected to a shaft 3 as an output member, a pressure member 5, driving-side clutch discs 6 and driven-side clutch discs 7, a limiting member 10, and/or a slide-suppressing member 13.

The power transmitting apparatus of FIG. 7 can be formed with a first cam surface 4a of clutch member-side and a first cam surface 5a of a pressure member-side forming a press-contact assisting cam, and a second cam surface 4b of clutch member-side and a second cam surface 5b of a pressure member-side forming a back-torque limiting cam, respectively. Same reference numerals are used for designating same components as those used in the embodiments of FIGS. 1-5 and detailed description of them will be omitted.

In some embodiments, a slide-suppressing member 13 is arranged on the fitting surface "β" of the pressure member 5 and not on the fitting surface "α" of the clutch member 4. In some cases, the slide-suppressing member 13 is mounted on the fitting surface "β" of the pressure member 5 there along (e.g., by adhesion as shown in FIG. 7).

The slide-suppressing member 13 can be formed of a frictional sheet member and can function to apply sliding resistance to the pressure member 5 when the pressure member 5 is rotated relative to the clutch member 4. In some cases, the slide-suppressing member 13 slides on the fitting surface "α" of the clutch member 4 and cause sliding resistance against the fitting surface "α" when the pressure member 5 rotates relative to the clutch member 4. Although it is shown in this embodiment that the slide-suppressing member 13 is arranged on the fitting surface "β" of the pressure member 5, it is possible to arrange the slide-suppressing member 13 on the fitting surface "α" of the clutch member 4.

In some embodiments which are provided with slide-suppressing members 11-13 applying sliding resistance to the pressure member 5 when the pressure member 5 is rotated relative to the clutch member 4, it is possible to suppress the vibration of the pressure member 5 by suppressing the rotation of the pressure member 5 relative to the clutch member 4. In some cases where the power transmitting apparatus comprises the press-contact assisting cam and the back-torque limiting cam, it is possible to prevent the pressure member 5 from being rotationally vibrated due to transmission of vibration of an engine etc. to the pressure member and thus to prevent the vibration from being transmitted to operation means of a vehicle such as a clutch lever etc.

In some cases where the pressure member 5 and the clutch member 4 are assembled with being axially fitted each other, and the slide-suppressing members 11-13 are arranged on fitting surface α or β of the pressure member 5 or of the clutch member 4, it is possible to avoid generation of other resistances (e.g. compression resistances or other resistances) in addition to the sliding resistance by the slide-suppressing members 11-13 and it is possible to suppress the rotational vibration of the pressure member 5 with little or no adverse effect on the operability of the pressure member 5.

Figure 8:
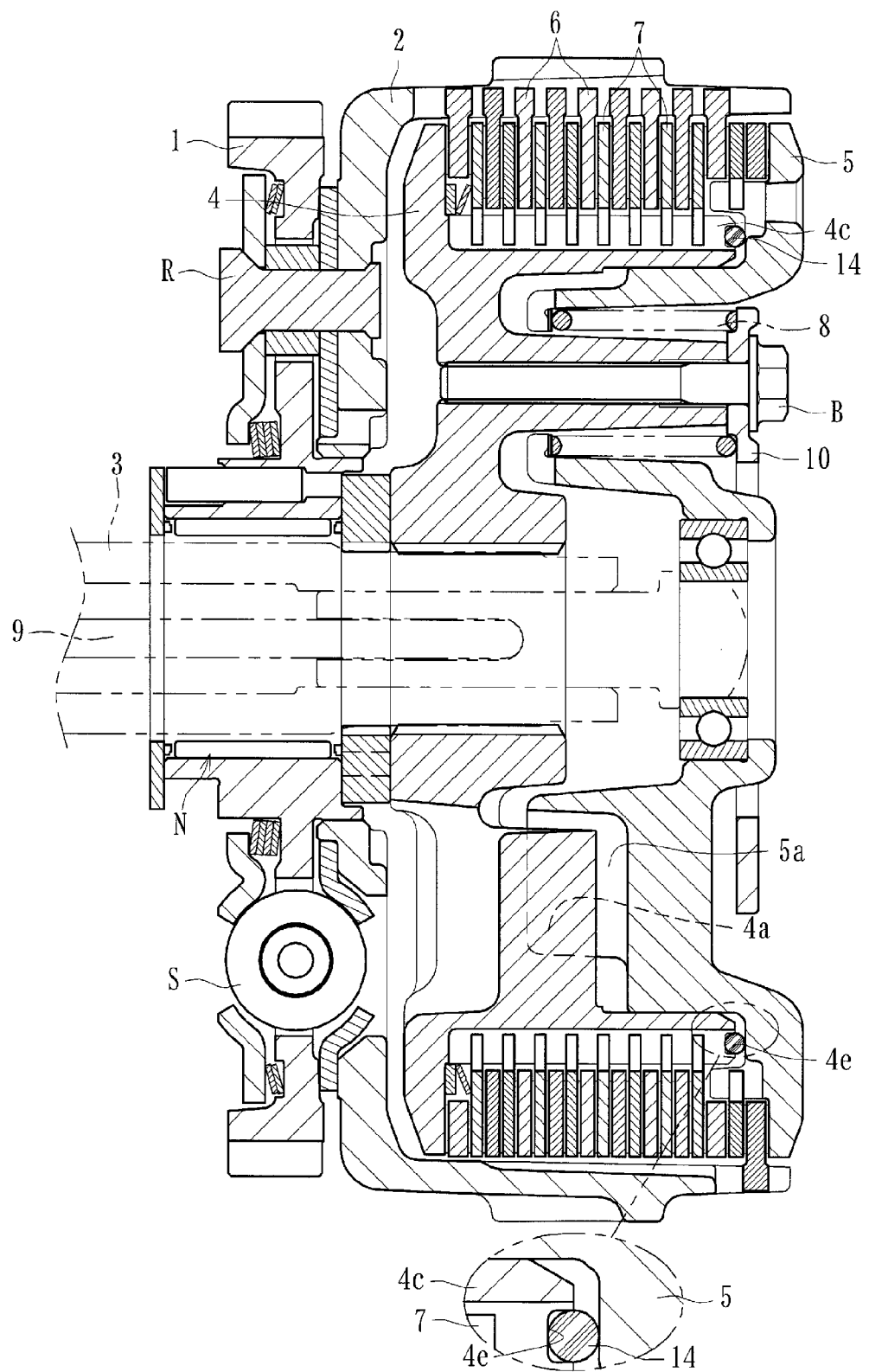
FIG. 8 is a longitudinal sectional view of a power transmitting apparatus of still another embodiment of the present inventions.

According to some variants, a power transmitting apparatus is mounted on vehicles such as a motorcycle or other vehicle to arbitrarily transmit or cut off the driving power of an engine to or from a transmission or driving wheel. As shown in FIG. 8, the power transmitting apparatus can comprise a clutch housing 2 formed by die-casting on which a gear 1 as an input member is mounted, a clutch member 4 connected to a shaft 3 as an output member, a pressure member 5, driving-side clutch discs 6 and driven-side clutch discs 7, a limiting member 10, and/or a slide-suppressing member 14.

In some cases, the power transmitting apparatus of this embodiment is formed with a first cam surface 4a of clutch member-side and a first cam surface 5a of pressure member-side forming a press-contact assisting cam, and a second cam surface 4b of clutch member-side and a second cam surface 5b of pressure member-side forming a back-torque limiting cam, respectively. Same reference numerals are used for designating same components as those used in the embodiments of FIGS. 1-5 and detailed description of them will be omitted.

According to some embodiments, a slide-suppressing member 14 is arranged on an axially facing surface of the pressure member 5 or of the clutch member 4 (e.g., surfaces of the pressure member 5 and the clutch member 4 axially facing to each other). In some cases, an annular mounting groove 4e is formed on the end surface of the clutch member 4 axially facing to the pressure member 5 (e.g., an upper end face of the spline fitting portion 4c) and the annular slide-suppressing member 14 is press-fitted in the annular mounting groove 4e.

The slide-suppressing member 14 can be formed of an annular sealing member (e.g., an O-ring or other sealing member) and functions to apply sliding resistance to the pressure member 5 when the pressure member 5 is rotated relative to the clutch member 4. In some cases, the slide-suppressing member 14 slides on its abutting surface of the pressure member 5 and causes sliding resistance against the abutting surface of the pressure member 5 when the pressure member 5 rotates relative to the clutch member 4. Although it is shown in FIG. 8 that the slide-suppressing member 14 is arranged on the end surface of the clutch member 4, it is possible to arrange the slide-suppressing member 14 on the axially facing surface of the pressure member 5.

According to some embodiments where the power transmitting apparatus is provided with slide-suppressing member 14 applying sliding resistance to the pressure member 5 when the pressure member 5 is rotated relative to the clutch member 4, it is possible to suppress vibration of the pressure member 5 by suppressing rotation of the pressure member 5 relative to the clutch member 4. In some cases where the slide-suppressing member 14 is arranged on an axially facing surface of the pressure member 5 or of the clutch member 4, it is possible to generate the sliding resistance when the pressure member 5 is close to the clutch member 4 and not to generate the sliding resistance when the pressure member 5 is axially separated from the clutch member 4.

Figure 9:
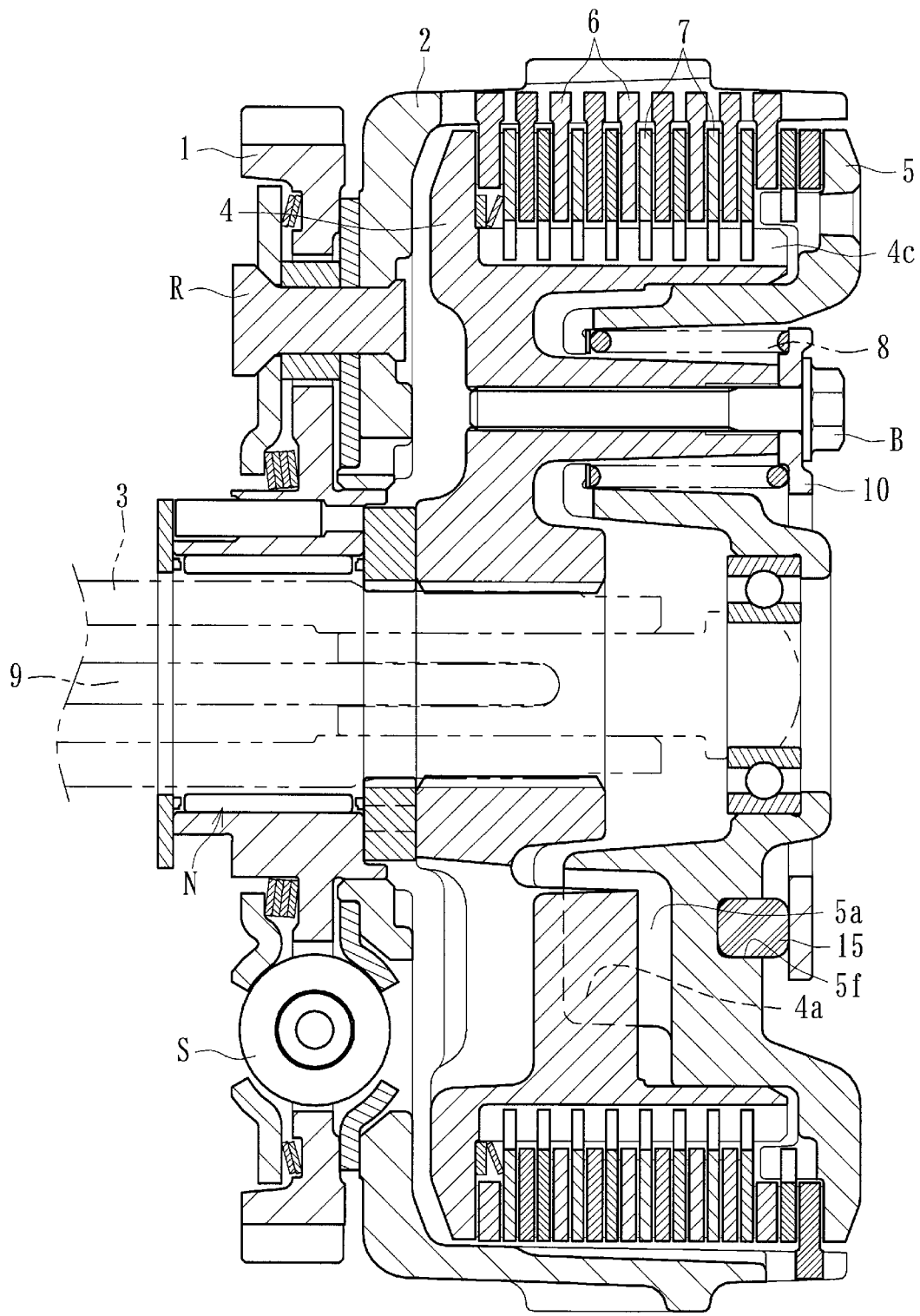
FIG. 9 is a longitudinal sectional view of a power transmitting apparatus of yet still another embodiment of the present inventions.

According to some variants, a power transmitting apparatus can be mounted on vehicles such as a motorcycle or other vehicle to arbitrarily transmit or cut off the driving power of an engine to or from a transmission or driving wheel. As shown in FIG. 9, the power transmitting apparatus can comprise a clutch housing 2 formed by die-casting on which a gear 1 as an input member is mounted, a clutch member 4 connected to a shaft 3 as an output member, a pressure member 5, driving-side clutch discs 6 and driven-side clutch discs 7, a limiting member 10, and/or a slide-suppressing member 15.

In some cases, the power transmitting apparatus of FIG. 9 is formed with a first cam surface 4a of clutch member-side and a first cam surface 5a of pressure member-side forming a press-contact assisting cam, and a second cam surface 4b of clutch member-side and a second cam surface 5b of pressure member-side forming a back-torque limiting cam respectively. Same reference numerals are used for designating same components as those used in FIGS. 1-5 and detailed description of them will be omitted.

According to some embodiments of the present disclosure, slide-suppressing members 15 are arranged on the pressure member 5 so as to slide on a surface of the limiting member 10. More in detail as shown in FIG. 9, mounting recesses 5f can be formed on the end surface of the pressure member 5 axially facing to a surface of the limiting member 10 mounted on the clutch member 4 and the slide-suppressing members 15 can be press-fitted in the mounting recesses 5f. The slide-suppressing members 15 can be formed of block-like rubber members (e.g., similar to the slide-suppressing members 11) and can function to apply sliding resistance to the pressure member 5 (or to the limiting member 10) when the pressure member 5 is rotated relative to the clutch member 4. That is, the slide-suppressing members 15 can slide on the surface of the limiting member 10 and can cause sliding resistance against the sliding surface of the limiting member 10 (accordingly, against the clutch member 4) when the pressure member 5 rotates relative to the clutch member 4.

According to some embodiments where the power transmitting apparatus is provided with slide-suppressing members 15 applying sliding resistance to the pressure member 5 when the pressure member 5 is rotated relative to the clutch member 4, it is possible to suppress vibration of the pressure member 5 by suppressing rotation of the pressure member 5 relative to the clutch member 4. In some cases where the power transmitting apparatus comprises the limiting member 10 for preventing the pressure member 5 from being separated from the clutch member 4 exceeding a predetermined distance, and the slide-suppressing members 15 are arranged on the pressure member so that they can slide on a surface of the limiting member 10, it is possible to mount or replace the slide-suppressing members 15 when the clutch member 4 and the pressure member 5 are assembled each other.

As illustrated, in some embodiments the slide-suppressing members 11, 12, 13, 14, 15 are positioned such that the slide-suppressing members 11, 12, 13, 14, 15 are compressed against a portion of the pressure member 5. For example, in some embodiments one or more of the slide-suppressing members 11, 12, 13, 14, 15 are compressed between a portion of the clutch member 4 and a portion of the pressure member 5 which do not move substantially toward or away from each other when the pressure member 5 rotates relative to the clutch member 4, for example, positions between the clutch member 4 and the pressure member 5 in a direction parallel to the axis of rotation of the clutch member 4. Optionally, the slide-suppressing members 11, 12, 13 can be disposed between surfaces that only move substantially parallel to each other when the pressure member 5 rotates relative to the clutch member 4. Thus, the slide-suppressing members 11, 12, 13 can be positioned so as to avoid subjecting the suppressing members 11, 12, 13 to high compressive forces (e.g., driving forces, forces from the back-torque limiting cams, forces from the press-contact assisting cam).

Although several embodiments of the present inventions have been described, the present inventions are not limited to these embodiments. For example, the slide-suppressing members may be formed of any materials (e.g. any plastics or metals causing sliding resistance other than rubber, O-ring and frictional materials) or may be formed as having any configurations (e.g., an annular configuration may be formed as block configuration or block configuration may be annular configurations). The present inventions may be applied to a power transmitting apparatus having either one of the press-contact assisting cam or back-torque limiting cam. In addition, the present inventions may be applied to many kinds of multiple disc clutch type power transmitting apparatuses used for automobiles, three-wheeled or four-wheeled buggies or machines for general use other than motorcycles, The present inventions can be applied to any power transmitting apparatus comprising a slide-suppressing member applying sliding resistance to a pressure member when a pressure member is rotated relative to the clutch member although it has different appearance or additional functions other than those shown in the embodiments of the present inventions.

What is claimed is:

1. A power transmitting apparatus comprising:
a clutch housing rotatable together with an input member;
a plurality of driving-side clutch discs mounted on the clutch housing;
an output member;
a clutch member connected to the output member;
a plurality of driven-side clutch discs mounted on the clutch member and arranged between the driving-side clutch discs alternately therewith;
a pressure member mounted on the clutch member and axially movable relative to the clutch member, wherein the driving-side clutch discs and the driven-side clutch discs are forced to be press-contacted with each other by a press-contacting force when the pressure member is moved axially toward the clutch member in order to transmit a rotational driving force from the input member to the output member, and wherein the press-contacting force acting on the driving-side clutch discs and the driven-side clutch discs is released when the pressure member moves axially away from the clutch member in order to cut off the rotational driving force from the input member to the output member; and
one or more slide-suppressing members providing sliding resistance, when the clutch discs are engaged and released, against relative rotational movement of the clutch member and the pressure member.

2. The power transmitting apparatus of claim 1 wherein the pressure member and the clutch member are assembled axially fitted to each other, and wherein the one or more slide-suppressing member are arranged on a fitting surface of the pressure member or of the clutch member.

3. The power transmitting apparatus of claim 1 wherein the one or more slide-suppressing members are arranged on an axially facing surface of the pressure member or of the clutch member.

4. The power transmitting apparatus of claim 1 wherein the power transmitting apparatus further comprises a limiting member for preventing the pressure member from being separated from the clutch member beyond a predetermined distance, and wherein the one or more slide-suppressing members are arranged on the pressure member so that they can slide on a surface of the limiting member.

5. A power transmitting apparatus comprising:
an input member rotatable about an axis of rotation;
a clutch housing rotatable together with the input member;
a plurality of driving-side clutch discs mounted on the clutch housing;
an output member;
a clutch member connected to the output member and positioned at least partially within the clutch housing;

a plurality of driven-side clutch discs mounted on the clutch member and interleaved with the driving-side clutch discs;

a pressure member mounted on the clutch member and biased toward the clutch member in a direction substantially parallel to the axis of rotation, the pressure member applying a press-contacting force against the driving-side clutch discs to press-contact the driving-side clutch discs against the driven-side clutch discs when the pressure member is moved toward the clutch member, the press-contact between the driving-side clutch discs and the driven-side clutch discs transmitting a rotation driving force from the input member to the output member; and one or more slide-suppressing members positioned so as to increase rotational frictional resistance of relative movement of the clutch member and the pressure member;

wherein the one or more slide-suppressing members are compressed during both engagement and disengagement of the driven-side and driving-side clutch discs.

6. The power transmitting apparatus of claim 5, wherein at least one of the one or more slide-suppressing members is positioned between the clutch member and the pressure member in a direction parallel to the axis of rotation.

7. The power transmitting apparatus of claim 5, wherein at least one of the one or more slide-suppressing members is compressed in a direction parallel to the axis of rotation.

8. The power transmitting apparatus of claim 5, further comprising a limiting member connected to the clutch member, and one or more biasing members mounted between the pressure member and the limiting member, wherein the one or more biasing members bias the pressure member toward the clutch member in a direction parallel to the axis of rotation.

9. The power transmitting apparatus of claim 8, wherein one or more of the slide-suppressing members is positioned in contact with the limiting member and the pressure member.

10. The power transmitting apparatus of claim 5, wherein at least one of the one or more slide-suppressing members has an annular shape and is positioned between the clutch member and the pressure member in a radial direction with respect to the axis of rotation.

11. The power transmitting apparatus of claim 5, wherein at least one of the one or more slide-suppressing members is positioned at least partially within a mounting recess on the pressure member.

12. The power transmitting apparatus of claim 5, wherein at least one of the one or more slide-suppressing members is positioned at least partially within a mounting recess on the clutch member.

13. The power transmitting apparatus of claim 1, wherein the one or more slide-suppressing members are constructed from an elastomeric material.

14. The power transmitting apparatus of claim 1, wherein the one or more slide-suppressing members are structurally separate from both the clutch member and the pressure member.

15. The power transmitting apparatus of claim 5, wherein the one or more slide-suppressing members are constructed from an elastomeric material.

16. A power transmitting apparatus comprising:
a clutch housing rotatable together with an input member;
a plurality of driving-side clutch discs mounted on the clutch housing;

an output member;

a clutch member connected to the output member;

a plurality of driven-side clutch discs mounted on the clutch member and arranged between the driving-side clutch discs alternately therewith;

a pressure member mounted on the clutch member and axially movable relative to the clutch member, wherein the driving-side clutch discs and the driven-side clutch discs are forced to be press-contacted with each other by a press-contacting force when the pressure member is moved axially toward the clutch member in order to transmit a rotational driving force from the input member to the output member, and wherein the press-contacting force acting on the driving-side clutch discs and the driven-side clutch discs is released when the pressure member moves axially away from the clutch member in order to cut off the rotational driving force from the input member to the output member;

a press-contact assisting cam for increasing the press-contacting force acting on the driving-side clutch discs and the driven-side clutch discs by causing relative rotation of the pressure member and the clutch member and bringing them close to each other when the rotational driving power inputted to the input member is transmitted to the output member;

a back-torque limiting cam for releasing the press-contacting force acting on the driving-side clutch discs and the driven-side clutch discs by causing relative rotation of the pressure member and the clutch member and separating them from each other when a rotational speed of the output member exceeds that of the input member; and one or more slide-suppressing members, separate from said press-contact assisting cam and from said driving-side and driven-side clutch discs, and providing sliding resistance against relative rotational movement of the clutch member and the pressure member.

17. The power transmitting apparatus of claim 16 wherein the pressure member and the clutch member are assembled axially fitted to each other, and wherein the one or more slide-suppressing member are arranged on a fitting surface of the pressure member or of the clutch member.

18. The power transmitting apparatus of claim 16 wherein the one or more slide-suppressing members are arranged on an axially facing surface of the pressure member or of the clutch member.

19. The power transmitting apparatus of claim 16 wherein the power transmitting apparatus further comprises a limiting member for preventing the pressure member from being separated from the clutch member beyond a predetermined distance, and wherein the one or more slide-suppressing members are arranged on the pressure member so that they can slide on a surface of the limiting member.

* * * * *